(12) United States Patent
Jiang et al.

(10) Patent No.: US 11,271,401 B2
(45) Date of Patent: Mar. 8, 2022

(54) SYNERGIC IDENTIFICATION METHOD FOR DYNAMIC STABILITY OF POWER SYSTEM

(71) Applicant: NORTHEAST ELECTRIC POWER UNIVERSITY, Jilin (CN)

(72) Inventors: Tao Jiang, Jilin (CN); Xue Li, Jilin (CN); Song Zhang, Jilin (CN); Houhe Chen, Jilin (CN); Guoqing Li, Jilin (CN); Rufeng Zhang, Jilin (CN); Changjiang Wang, Jilin (CN)

(73) Assignee: NORTHEAST ELECTRIC POWER UNIVERSITY, Jilin (CN)

( * ) Notice: Subject to any disclaimer, the term of this patent is extended or adjusted under 35 U.S.C. 154(b) by 57 days.

(21) Appl. No.: 16/344,273

(22) PCT Filed: Jan. 26, 2018

(86) PCT No.: PCT/CN2018/074327
§ 371 (c)(1),
(2) Date: Apr. 23, 2019

(87) PCT Pub. No.: WO2019/080393
PCT Pub. Date: May 2, 2019

(65) Prior Publication Data
US 2021/0336437 A1    Oct. 28, 2021

(30) Foreign Application Priority Data

Oct. 25, 2017    (CN) .......................... 201711008097.0

(51) Int. Cl.
*H02J 3/24*    (2006.01)
(52) U.S. Cl.
CPC ........... *H02J 3/242* (2020.01); *H02J 2203/20* (2020.01)

(58) Field of Classification Search
CPC .............................. H02J 3/242; H02J 2203/20
(Continued)

(56) References Cited

U.S. PATENT DOCUMENTS

| 2013/0096698 | A1 | 4/2013 | Ulyanov | |
|---|---|---|---|---|
| 2013/0204557 | A1* | 8/2013 | Trudnowski | H02J 13/00002 702/60 |
| 2015/0105927 | A1* | 4/2015 | Baone | G05F 1/66 700/292 |

FOREIGN PATENT DOCUMENTS

| CN | 103368175 A | 10/2013 |
|---|---|---|
| CN | 104933639 A | 9/2015 |

(Continued)

OTHER PUBLICATIONS

Coherency Identification in Interconnected Power System—An Independent Component Analysis Approach, IEEE Transactions on Power Systems, vol. 28, No. 2, May 2013, By: M. A. M. Ariff, Student Member, IEEE, and B. C. Pal, Senior Member, IEEE (Year: 2013).*

(Continued)

*Primary Examiner* — Jigneshkumar C Patel
(74) *Attorney, Agent, or Firm* — Dragon Sun Law Firm, PC; Jinggao Li, Esq.

(57) ABSTRACT

A synergic identification method for dynamic stability of a power system is provided, including: acquiring each dominant oscillation mode; acquiring a critical wavelet scale factor range corresponding to each dominant oscillation mode; calculating an oscillation modality of the dominant oscillation mode corresponding to the critical wavelet scale factor range by a right singular vector corresponding to a maximum value among first singular values of each reconstructed wavelet coefficient matrix in the critical wavelet scale factor range; calculating, according to the relation between left and right feature vectors and the estimated (Continued)

oscillation modality, a left feature vector corresponding to each dominant oscillation mode and calculating a participation factor of each measurement channel in this dominant oscillation mode; calculating direction cosines between measurement channels by the oscillation modality of the dominant oscillation mode, and classifying coherent generator groups or coherent bus groups in the system by the direction cosines.

4 Claims, 13 Drawing Sheets

(58) Field of Classification Search
USPC .......................................................... 700/286
See application file for complete search history.

(56) References Cited

FOREIGN PATENT DOCUMENTS

| CN | 104993480 A | 10/2015 |
|----|-------------|---------|
| CN | 106546847 A | 3/2017  |
| CN | 106786514 A | 5/2017  |

OTHER PUBLICATIONS

International Search Report of PCT/CN2018/074327.
Written Opinion of PCT/CN2018/074327.

* cited by examiner

SYNERGIC IDENTIFICATION METHOD FOR DYNAMIC STABILITY OF POWER SYSTEM

CROSS REFERENCE TO RELATED TO RELATED APPLICATIONS

This application is a national stage application of PCT Application No. PCT/CN2018/074327. This application claims priority from PCT Application No. PCT/CN2018/074327, filed Jan. 26, 2018, and CN Application No. 201711008097.0, filed Oct. 25, 2017, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure relates to the technical field of power systems, and in particular relates to a synergic identification method for dynamic stability of a power system.

BACKGROUND OF THE PRESENT DISCLOSURE

With the continual enlargement of interconnection scale of regional power grids, the continuous increase of high-capacity and long-distance DC power transmission and the large-scale access of renewable energy resources, the inter-area low-frequency oscillation has become one of important factors that limit the transmission capacities of interconnected power grids and threatens the safe and stable operation of power grids. Therefore, it is of great practical significance to study the dynamic stability of power grids in the context of national interconnection and large-scale access of renewable energy resources.

With the large-scale configuration of Phasor Measurement Unit (PMU) devices in power grids, the continuous improvement of power communication networks and the continuous construction and application of wide-area measurement systems in interconnected regional power grids, the methods for analyzing and estimating dynamic stability of a power system based on wide-area measurement information have attracted more and more attention in the industrial and academic circles.

According to different kinds of signals actually measured in the power system, the methods for analyzing dynamic stability of a power system based on wide-area measurement information are classified into a method for analyzing dynamic stability based on measured signals, a method for analyzing dynamic stability based on failure signals and a method for analyzing dynamic stability based on noise-like signals.

1. in the method for analyzing dynamic stability based on measured signals, by mainly injecting random noise excitation into a power system, the input excitation data and the output response data of the system are acquired to estimate a dynamic transfer function matrix or a state matrix of the system, so as to identify a dominant oscillation mode of the power system.

The common identification algorithms for measuring signals include Empirical Transfer Function Estimate (ETFE), Subspace State Space System Identification (N4SID) and Prediction Error Method (PEM).

2. in the method for analyzing dynamic stability based on failure signals, a dominant oscillation mode of a power system is identified mainly by estimating, from failure signals of the power system, a transfer function matrix or a state matrix of the power system or fitting signals of multiple oscillation signals. The common algorithms includes Prony, recursive Prony[1], Hilbert Spectral Analysis (HAS), Eigensystem Realization Algorithm (ERA), Kalman filtering, continuous wavelet transformation, stochastic subspace identification and TLS-ESPRIT identification[2].

3. in the method for analyzing dynamic stability based on noise-like signals, a dominant oscillation mode of a power system is identified mainly by estimating, from noise-like signals of the power system, a transfer function matrix or a state matrix of the power system, for example, Yule-Walker algorithm[3], Bootstrap based ARMA[4], ARX identification[5][6], ARMAX[7], RRLS-ARMAX[8] and stochastic subspace identification.

All the above methods focus on the identification of the dominant oscillation mode of the power system based on wide-area measurement information; however, the identification of dominant oscillation modalities, participation factors and coherent generator groups, which are all strongly correlated with the dominant oscillation mode and can provide power grid operation dispatchers with system dynamic stability improvement measures, have been carried out so far with difficulties.

Therefore, a heretofore unaddressed need exists in the art to address the aforementioned deficiencies and inadequacies.

SUMMARY OF THE PRESENT DISCLOSURE

To realize the synergic identification of dynamic stability of a power system based on wide-area measurement information, the present disclosure provides a synergic identification method for dynamic stability based on data-driven dominant oscillation modes, modalities, participation factors and coherent generator groups of a power system. The detailed description will be given hereinafter.

A synergic identification method for dynamitic stability of a power system is provided, including the following steps of:

acquiring each dominant oscillation mode, acquiring a critical wavelet scale factor range corresponding to each dominant oscillation mode, and calculating an oscillation modality of the dominant oscillation mode corresponding to the critical wavelet scale factor range by a left singular vector corresponding to a maximum value among first singular values of each reconstructed wavelet coefficient matrix in the critical wavelet scale factor range;

calculating, according to the relation between left and right feature vectors and the estimated oscillation modality, a left feature vector corresponding to each dominant oscillation mode, and then calculating a participation factor of each measurement channel in the power system in this dominant oscillation mode; and calculating direction cosines between measurement channels by the oscillation modality of the dominant oscillation mode, classifying coherent generator groups or coherent bus groups in the system by the direction cosines.

The detailed steps of "acquiring each dominant oscillation mode" are specifically:

for each critical wavelet scale factor range, reconstructing a wavelet coefficient matrix according to a critical wavelet scale factor, and performing singular value decomposition on each reconstructed wavelet coefficient matrix to obtain first singular values of each reconstructed wavelet coefficient matrix; and comparing the first singular values, acquiring a right singular vector corresponding to the maximum value among the first singular values, and calculating a dominant oscillation mode corresponding to the critical wavelet scale factor range.

The detailed steps of "acquiring a critical wavelet scale factor range corresponding to each dominant oscillation mode" are specifically:

calculating a wavelet power spectrum corresponding to each stretch factor in each wavelet coefficient matrix, and determining a critical wavelet scale factor corresponding to each dominant oscillation mode; and constructing a critical wavelet scale factor range corresponding to each dominant oscillation mode by considering the critical wavelet scale factor.

The method further includes:

acquiring, from a wide-area measurement system, state measurement information of the power system, and standardizing the state measurement information; and performing wavelet transformation on the standardized state measurement information in each measurement channel to acquire a wavelet coefficient matrix corresponding to each measurement channel.

The technical solutions of the present disclosure have the following beneficial effects.

1. in virtue of continuous wavelet transformation, the present disclosure provides a synergic identification method for dynamic stability of a power system based on wide-area measurement information, to realize the synergic estimation of dominant oscillation modes, modalities, participation factors and coherent generator groups.

2. with the present disclosure, richer power grid operation state information is provided for power grid operation dispatchers so as to improve the dynamic stability of the power system.

BRIEF DESCRIPTION OF THE DRAWINGS

The accompanying drawings illustrate one or more embodiments of the present disclosure and, together with the written description, serve to explain the principles of the disclosure. Wherever possible, the same reference numbers are used throughout the drawings to refer to the same or like elements of an embodiment.

DETAILED DESCRIPTION OF THE PRESENT DISCLOSURE

Figure 1:
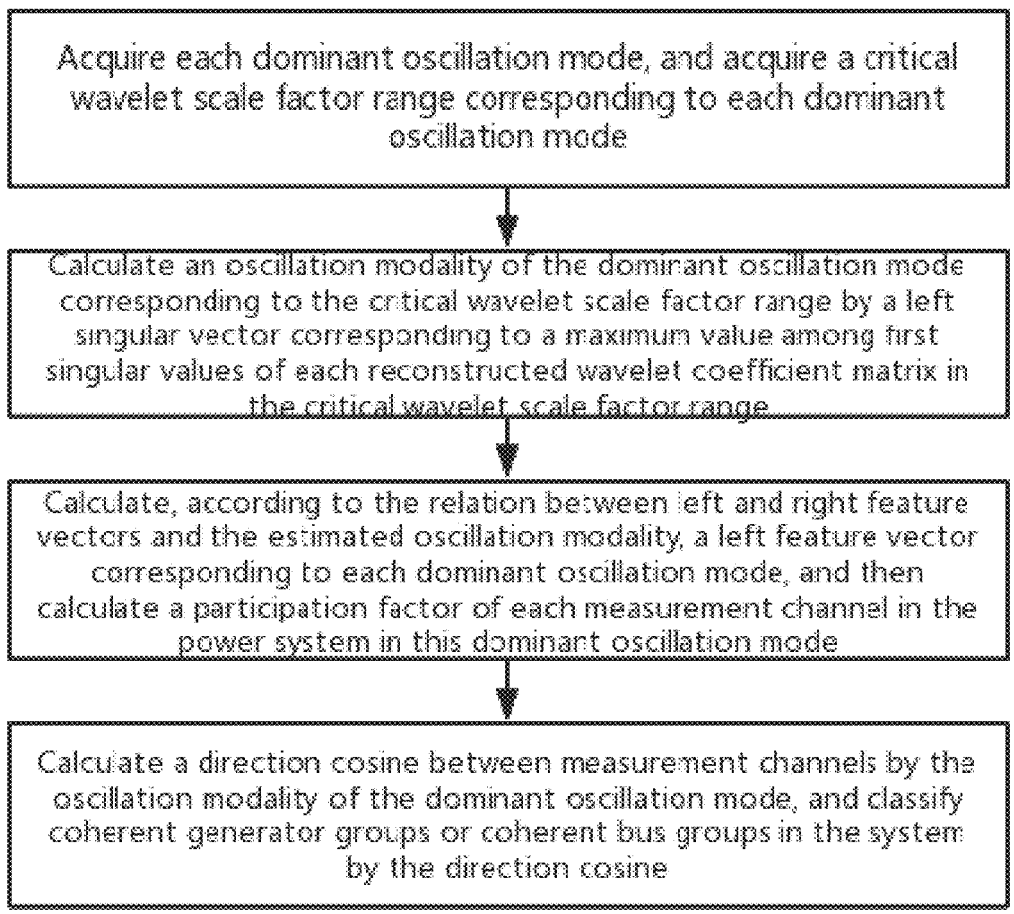
FIG. 1 is a flowchart of a synergic identification method for dynamic stability of a power system.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the disclosure to those skilled in the art. Like reference numerals refer to like elements throughout.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It is appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the disclosure or of any exemplified term. Likewise, the disclosure is not limited to various embodiments given in this specification.

It is understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It is understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present disclosure.

It is understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It is also appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It is understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present disclosure belongs. It is further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip.

The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Embodiments of the disclosure are illustrated in detail hereinafter with reference to accompanying drawings. It should be understood that specific embodiments described herein are merely intended to explain the disclosure, but not intended to limit the disclosure.

To make the objectives, technical solutions and advantages of the present disclosure clearer, the implementations of the present disclosure will be further described below in detail.

To overcome the deficiencies of the existing researches on the dominant oscillation modalities, participation factors and coherent generator groups based on wide-area measurement information mentioned in the background art, in virtue of continuous wavelet transformation, the embodiments of the present disclosure provide a synergic identification method for dynamic stability of a power system, which realizes the synergic identification of dominant oscillation modes, modalities, participation factors and coherent generator groups of the power system and provides power grid operation dispatchers with richer power grid operation state information to improve the dynamic stability of the power system.

Embodiment 1

A synergic identification method for dynamitic stability of a power system is provided, as shown in FIG. 1, including the following steps.

101: each dominant oscillation mode is acquired, and a critical wavelet scale factor range corresponding to each dominant oscillation mode is acquired.

102: an oscillation modality of the dominant oscillation mode corresponding to the critical wavelet scale factor range is calculated by a left singular vector corresponding to a maximum value among first singular values of each reconstructed wavelet coefficient matrix in the critical wavelet scale factor range.

103: a left feature vector corresponding to each dominant oscillation mode is calculated according to the relation between left and right feature vectors and the estimated oscillation modality, and a participation factor of each measurement channel in the power system in this dominant oscillation mode is then calculated.

104: direction cosines between measurement channels are calculated by the oscillation modality of the dominant oscillation mode, and coherent generator groups or coherent bus groups in the system are classified by the direction cosines.

In conclusion, by the steps 101-104 in this embodiment of the present disclosure, the influences on the result of dynamic system estimation based on a mathematical model of a power system from the factors such as element model and parameter accuracy can be avoided, the direction and content of dynamic estimation of the power system based on wide-area measurement information are perfected and expanded, and the dynamic stability estimation of the power system completely based on data is realized.

Embodiment 2

The solutions in Embodiment 1 will be further described below by specific calculation equations and examples. The detailed description will be given hereinafter.

201: state measurement information of a power system is acquired from a wide-area measurement system (which is a technical term known to those skilled in the art and will not be further described here), and the state measurement information is standardized.

Wherein, the standardization is a process of evaluating a standard score, i.e., a process of dividing a difference between a number and the mean number by the standard difference. The standardized data is simple and convenient for comparison, and can fully demonstrate the relation between data and the standard difference and reserve the original information of the data. The standardization is known to those skilled in the art and will not be further described in this embodiment of the present disclosure.

202: wavelet transformation is performed on the standardized state measurement information in each measurement channel to acquire a wavelet coefficient matrix corresponding to each measurement channel, specifically:

1) When the mother wavelet is a complex Morlet wavelet ((which is a technical term known to those skilled in the art and will not be further described here), the expressions of corresponding mother wavelet and daughter wavelet are:

$$\begin{cases} \psi(t) = \frac{1}{\sqrt{\pi f_b}} e^{-j2\pi f_c t} e^{-t^2/f_b} \\ \psi_{a,b}(t) = \frac{1}{\sqrt{a\pi f_b}} e^{-j2\pi f_c \frac{(t-b)}{a}} e^{-\frac{1}{f_b}\left(\frac{t-b}{a}\right)^2} \end{cases} \quad (1)$$

where $\psi(t)$ is a mother wavelet function, $\psi_{a,b}(t)$ is a daughter wavelet function, a is a wavelet scale factor, b is a wavelet time factor, $f_c$ and $f_b$ are the center frequency and bandwidth frequency of the mother wavelet, respectively, and t is the time.

Both the wavelet scale factor and the wavelet time factor are technical terms known to those skilled in the art and will not be further described here.

2) a measurement signal y(t) containing n oscillation modes is specifically expressed as:

$$y(t) = \sum_{k=1}^{n} A_k e^{-\zeta_k \omega_{0k} t} \cos(\omega_k t + \theta_k) \quad (2)$$

where $A_k$ is the magnitude of the $k^{th}$ oscillation mode, $\omega_{0k}$, $\omega_k$ and $\zeta_k$ are the undamped oscillation angular speed, the damped oscillation angular speed and the oscillation damping ratio of the $k^{th}$ oscillation mode, respectively, and $\theta_k$ is the phase of the $k^{th}$ oscillation mode;

3) wavelet transformation is performed on the measurement signal y(t), and the transformed y(t) is:

$$W(a, b) = \frac{1}{\sqrt{a}} \int_{-\infty}^{+\infty} y(t) \psi_{a,b}(t) dt. \quad (3)$$

4) a wavelet coefficient matrix W(a, b) of the measurement signal y(t) is expressed as:

$$W(a, b) = \begin{bmatrix} W(a_1, b) \\ W(a_2, b) \\ \vdots \\ W(a_k, b) \\ \vdots \\ W(a_p, b) \end{bmatrix} = \begin{bmatrix} W(a_1, b_1) & W(a_1, b_2) & \cdots & W(a_1, b_l) \\ W(a_2, b_1) & W(a_2, b_2) & \cdots & W(a_2, b_l) \\ \vdots & \vdots & \vdots & \vdots \\ W(a_k, b_1) & W(a_k, b_2) & \ddots & W(a_k, b_l) \\ \vdots & \vdots & \vdots & \vdots \\ W(a_p, b_1) & W(a_p, b_2) & \cdots & W(a_p, b_l) \end{bmatrix} \quad (4)$$

where $W(a_k, b_l)$ is a wavelet coefficient of y(t) when the stretch factor is $a_k$ and the time factor is $b_l$, and $W(a_k, b)$ is a wavelet coefficient vector of y(t) when the stretch factor is $a_k$;

203: a wavelet power spectrum corresponding to each stretch factor in each wavelet coefficient matrix W(a, b) is calculated, and a critical wavelet scale factor corresponding to each dominant oscillation mode is determined.

Since the high energy of the wavelet power spectrum indicates that the wavelet coefficient corresponding to the stretch factor embodies oscillation information and the low energy of the wavelet power spectrum indicates that the wavelet coefficient corresponding to the stretch factor embodies noise information, a wavelet scale factor having remarkable power spectrum energy is used as a critical wavelet scale factor.

During specific implementations, an energy threshold is set, and a wavelet scale factor having actual power spectrum energy greater than the threshold is used as a critical wavelet scale factor. The value of the energy threshold is set according to the requirements in practical applications and will not be limited in this embodiment of the present disclosure.

204: a critical wavelet scale factor range corresponding to each dominant oscillation mode is constructed by considering the critical wavelet scale factor determined for each wavelet coefficient matrix W(a, b).

Wherein, critical wavelet scale factors are usually distributed in clusters. For a wavelet power spectrum obtained for a wavelet coefficient matrix W(a, b), a plurality of clusters of critical wavelet scale factors having obviously high energy are often obtained, and a segment consisting of the plurality of clusters of critical wavelet scale factors having obviously high energy is called a critical wavelet scale factor range.

During specific implementations, the number of clusters is not limited in this embodiment of the present disclosure and will be determined according to the requirements in practical applications.

205: For each critical wavelet scale factor range, a wavelet coefficient matrix is reconstructed according to the critical wavelet scale factor; singular value decomposition is performed on each reconstructed wavelet coefficient matrix, and the singular values obtained after the decomposition are arranged in descending order to obtain a first singular value (i.e., the maximum singular value) of each reconstructed wavelet coefficient matrix; the first singular values of each reconstructed wavelet coefficient matrix are compared to obtain a maximum value, and a right singular vector corresponding to the maximum value among the first singular values is obtained; and, an oscillation frequency and a damping ratio of the dominant oscillation mode corresponding to this critical wavelet scale factor range are calculated, specifically: (1) based on stretch factors in this critical wavelet scale factor range, a wavelet coefficient matrix $W'(a_k, b)$ shown in equation (5) is reconstructed according to the stretch factors:

$$W'(a_k, b) = \begin{bmatrix} W_1(a_k, b_1) & W_1(a_k, b_2) & \cdots & W_1(a_k, b_h) & \cdots & W_1(a_k, b_l) \\ W_2(a_k, b_1) & W_2(a_k, b_2) & \cdots & W_2(a_k, b_h) & \cdots & W_2(a_k, b_l) \\ \vdots & \vdots & \vdots & \vdots & \vdots & \vdots \\ W_i(a_k, b_1) & W_i(a_k, b_2) & \cdots & W_i(a_k, b_h) & \cdots & W_i(a_k, b_l) \\ \vdots & \vdots & \vdots & \vdots & \vdots & \vdots \\ W_m(a_k, b_1) & W_m(a_k, b_2) & \cdots & W_m(a_k, b_h) & \cdots & W_m(a_k, b_l) \end{bmatrix} \quad (5)$$

where $a_k$ is the $k^{th}$ critical wavelet scale factor in the critical wavelet scale factor range, and $W_i(a_k, b_h)$ is the element in the $k^{th}$ row and the $h^{th}$ column in the wavelet coefficient matrix of the measurement channel.

(2) Singular value decomposition is performed on the reconstructed wavelet coefficient matrix $W'(a_k, b)$[9]:

$$W'(a_k, b) = U_{a_k} S_{a_k} V_{a_k} \quad (6)$$

where $U_{a_k}$, $S_{a_k}$ and $V_{a_k}$ are the left singular vector matrix, the singular value matrix and the right singular vector matrix of $W'(a_k, b)$, respectively. The first singular value, the first singular left vector and the first singular right vector obtained after decomposition are stored in the values of λ, U and V, respectively, to eventually obtain a first singular vector λ, a first left singular vector matrix U and a first right singular vector matrix V shown in equation (7):

$$\begin{cases} \lambda = [\lambda_{a_{k-g}, 1} \; \lambda_{a_{k-g+1}, 1} \cdots \lambda_{a_{k-z-1}, 1} \; \lambda_{a_{k+z}, 1}] \\ U = [U_{a_{k-g}, 1} \; U_{a_{k-g+1}, 1} \cdots U_{a_{k-z-1}, 1} \; U_{a_{k+z}, 1}] \\ V = [V_{a_{k-g}, 1} \; V_{a_{k-g+1}, 1} \cdots V_{a_{k-z-1}, 1} \; V_{a_{k+z}, 1}] \end{cases} \quad (7)$$

where z and g are distances from the stretch factor corresponding to the determined dominant oscillation mode to a left boundary and a right boundary in the critical wavelet scale factor range, respectively.

(3) If the element $\lambda_{a_k, 1}$ in the vector is the maximum singular value in the vector λ, the oscillation frequency $f_k$ and the damping ratio $\zeta_k$ of the dominant oscillation mode $\lambda_k$ of the power system corresponding to this critical wavelet scale factor range R are:

$$\begin{cases} \omega_{0k} = \sqrt{\left(\dfrac{d(\ln|V_{a_k,1}|)}{dt}\right)^2 + \left(\dfrac{d(\text{angle}(V_{a_k,1}))}{dt}\right)^2} \\ f_k = \dfrac{\omega_{0k}}{2\pi} \\ \zeta_k = -\dfrac{\dfrac{d}{dt}(\ln|V_{a_k,1}|)}{\omega_{0k}} \end{cases} \quad (8)$$

where $V_{a_k,1}$ is the right singular vector corresponding to $\lambda_{a_k,1}$.

206: an oscillation modality of the dominant oscillation mode corresponding to the critical wavelet scale factor range is calculated by the left singular vector corresponding to the maximum value among the first singular values of the reconstructed wavelet coefficient matrices in the critical wavelet scale factor range[10], specifically:

The oscillation modality $u_k$ corresponding to the estimated dominant oscillation mode $\lambda_k$ is:

$$U_k = U_{a_k 1} \qquad (9)$$

where $U_{a_k,1}$ is the left singular vector corresponding to the first singular value $\lambda_{a_k,1}$.

207: a left feature vector corresponding to each dominant oscillation mode is calculated according to the relation between left and right feature vectors and the estimated oscillation modality, and a participation factor of each measurement channel in the power system in this dominant oscillation mode is then calculated, specifically:

(1) It can be known from the feature value analysis method that the oscillation modality uk of the dominant oscillation mode λk is used as a right feature vector of the feature value λk. A left feature vector of the feature value λk is calculated according to the relation between left and right feature vectors analyzed by the feature value λk (which is the same variable as the dominant oscillation mode) by the following equation:

$$v_k = u_k^{-1} = u_k \otimes \left((u_k^T u_k)^{-1} u_k^T\right)^T. \qquad (10)$$

(2) according to the left and right feature vectors of the feature value $\lambda_k$, the correlation (i.e., participation factor) between the measurement information in the $i^{th}$ measurement channel and the $k^{th}$ oscillation mode $\lambda_k$ is:

$$\rho_{i,k} = \frac{v_{i,k} u_{i,k}}{v_k^T u_k} \qquad (11)$$

where $v_{i,k}$ and $u_{i,k}$ are left and right feature vectors of the $k^{th}$ oscillation mode in the $i^{th}$ measurement channel.

208: direction cosines between measurement channels are calculated by the oscillation modality of the dominant oscillation mode, and coherent generator groups or coherent bus groups in the system are classified by the direction cosines, specifically:

(1) a dominant oscillation modality matrix u is constructed according to the oscillation modality associated with the dominant oscillation model estimated in the step 206:

$$u = [u_1 \; u_2 \; \cdots \; u_n] = \begin{bmatrix} u_{1,1} & u_{2,1} & \cdots & u_{n,1} \\ u_{1,2} & u_{2,2} & \cdots & u_{n,2} \\ \vdots & \vdots & \ddots & \vdots \\ u_{1,m} & u_{2,m} & \cdots & u_{n,m} \end{bmatrix}. \qquad (12)$$

(2) a direction cosine between any two measurement channels i and j is calculated according to the dominant oscillation modality matrix u by the following equation:

$$d_{ij} = \frac{\sum_{k=1}^{n} u_{ki} u_{kj}}{\sqrt{\sum_{k=1}^{n} u_{ki}^2 \sum_{k=1}^{n} u_{kj}^2}}. \qquad (13)$$

(3) the calculation of direction cosine $d_{ij}$ between any two measurement channels in the power system is repeated by the equation (13) to eventually obtain a direction cosine matrix d containing n measurement channels shown by the following equation:

$$d = \begin{bmatrix} d_{1,1} & d_{1,2} & \cdots & d_{1,n} \\ d_{2,1} & d_{2,2} & \cdots & d_{2,n} \\ \vdots & \vdots & \ddots & \vdots \\ d_{n,1} & d_{n2} & \cdots & d_{n,n} \end{bmatrix}. \qquad (14)$$

(4) coherent generator groups or coherent bus groups in the power system are classified according to the direction cosines.

The specific operation step is known to those skilled in the art and will not be further described in this embodiment of the present disclosure.

In conclusion, by the steps 201-208 in this embodiment of the present disclosure, the synergic identification of dominant oscillation modes, modalities, participation factors and coherent generator groups of the power system is realized, the influences on the result of dynamic system estimation based on the mathematical model of the power system from the factors such as element model and parameter accuracy are avoided, the direction and content of dynamic estimation of the power system based on wide-area measurement information are perfected and expanded, and the dynamic stability estimation of the power system completely based on data is realized.

Embodiment 3

The feasible verification of the technical scheme of the Embodiments 1 and 2 will be further described below in detail by the following embodiment with reference to FIGS. 2-22, Table 1 and Table 2.

Figure 2:
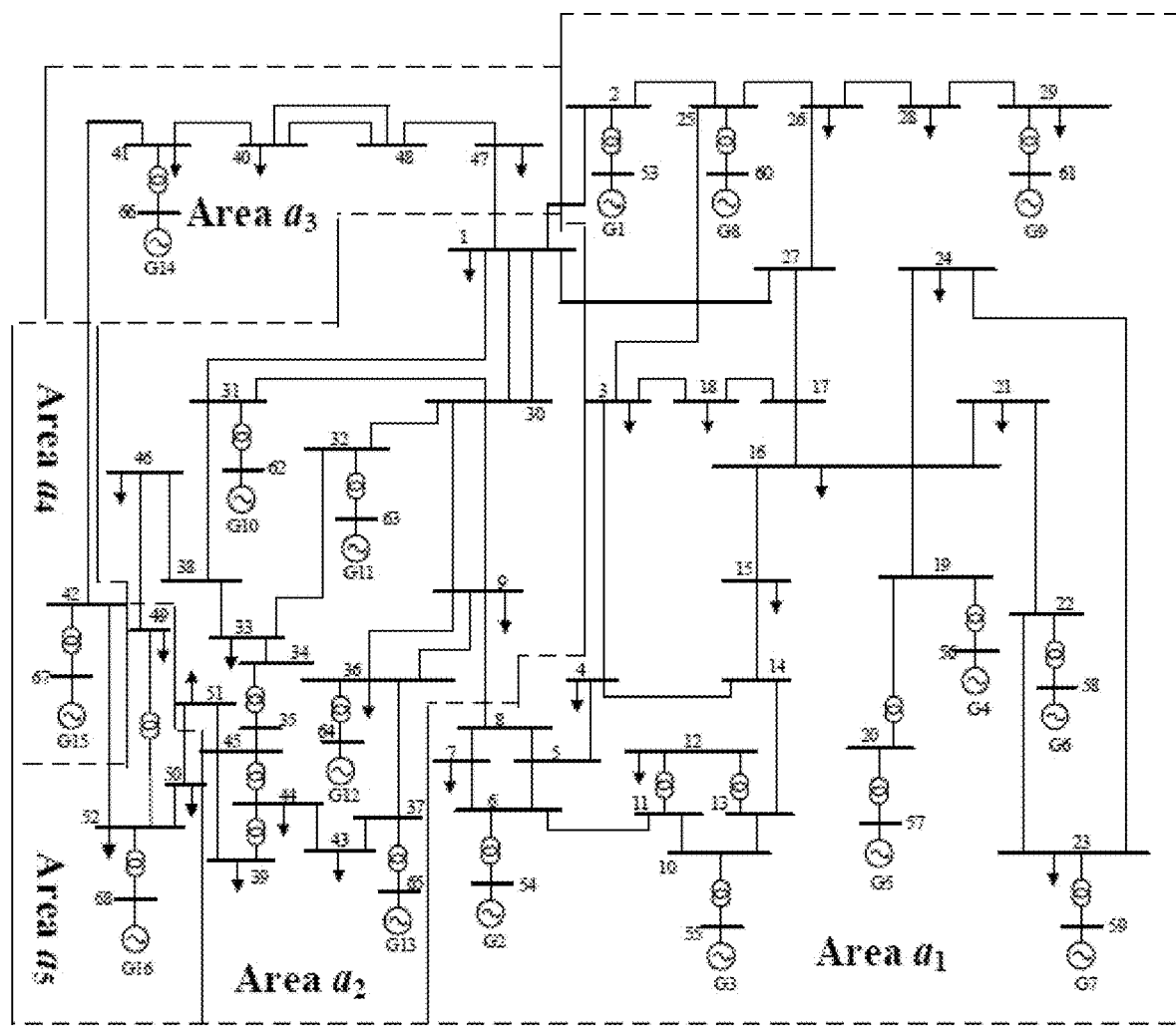
FIG. 2 is a diagram showing a 16-generator-68-bus system to be tested.

In this embodiment, the validity of Embodiments 1 and 2 is verified by taking the synergic identification of dynamic stability of a 16-generator-68-bus system as example. The 16-generator-68-bus system is shown in FIG. 2.

Figure 3:
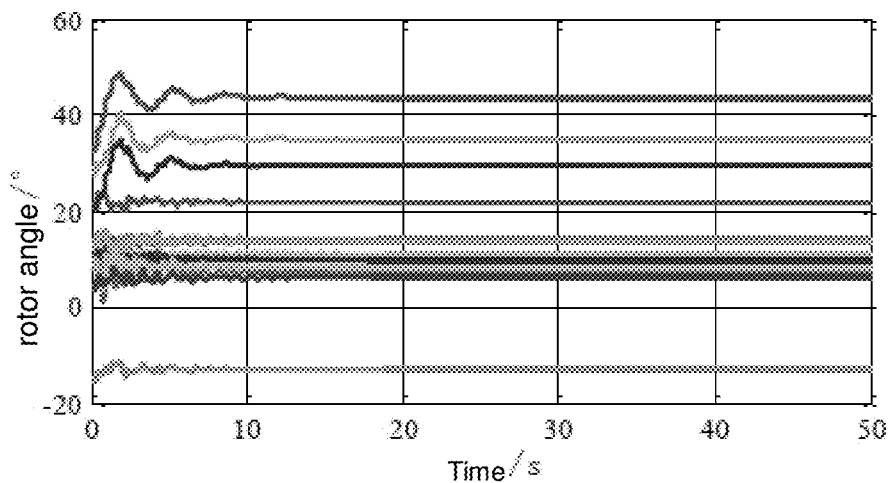
FIG. 3 is a graph showing swing curves of rotor angles of faulted generators in branches 46-49.
Figure 4:
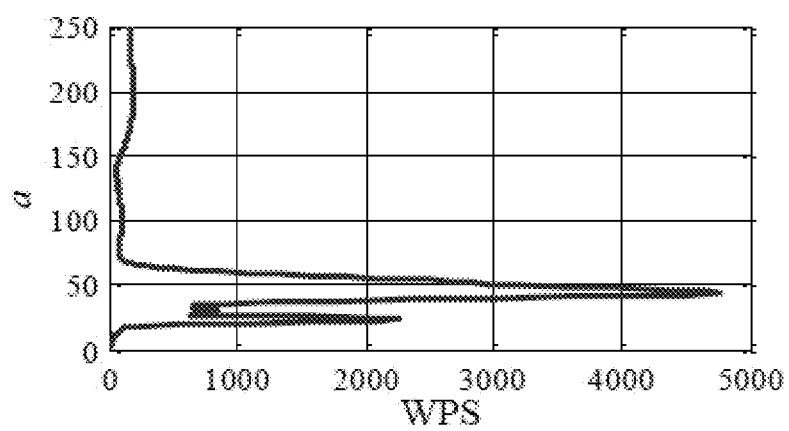
FIG. 4 is a diagram showing a wavelet power spectrum corresponding to the rotor angle of a generator G3.
Figure 5:
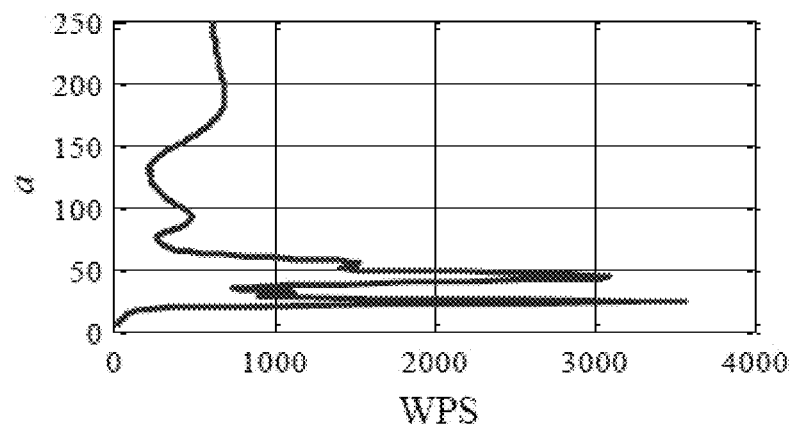
FIG. 5 is a diagram showing a wavelet power spectrum corresponding to the rotor angle of a generator G7.
Figure 6:
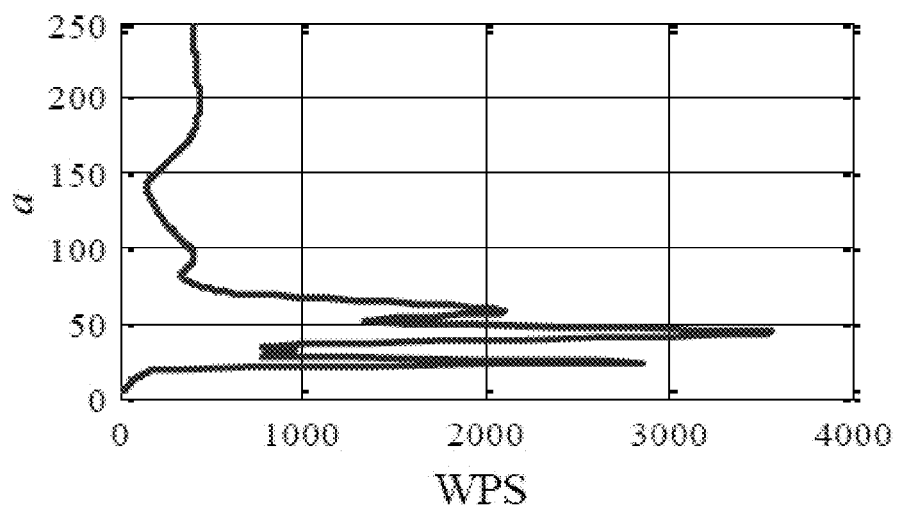
FIG. 6 is a diagram showing a wavelet power spectrum corresponding to the rotor angle of a generator G9.
Figure 7:
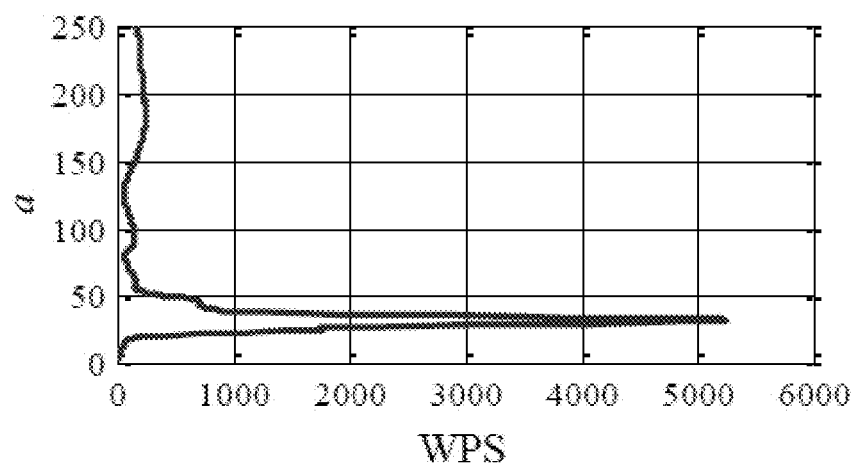
FIG. 7 is a diagram showing a wavelet power spectrum corresponding to the rotor angle of a generator G11.
Figure 8:
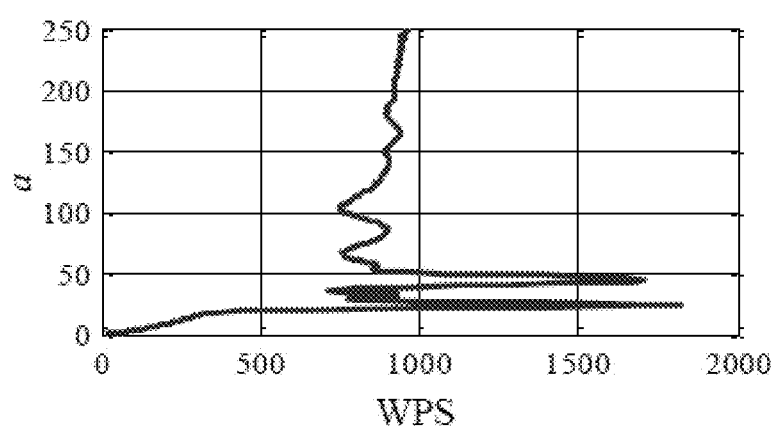
FIG. 8 is a diagram showing a wavelet power spectrum corresponding to the rotor angle of a generator G13.
Figure 9:
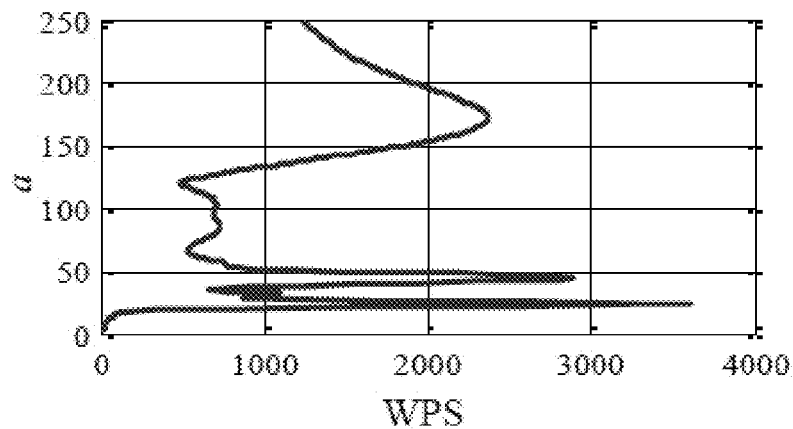
FIG. 9 is a diagram showing a wavelet power spectrum corresponding to the rotor angle of a generator G14.
Figure 10:
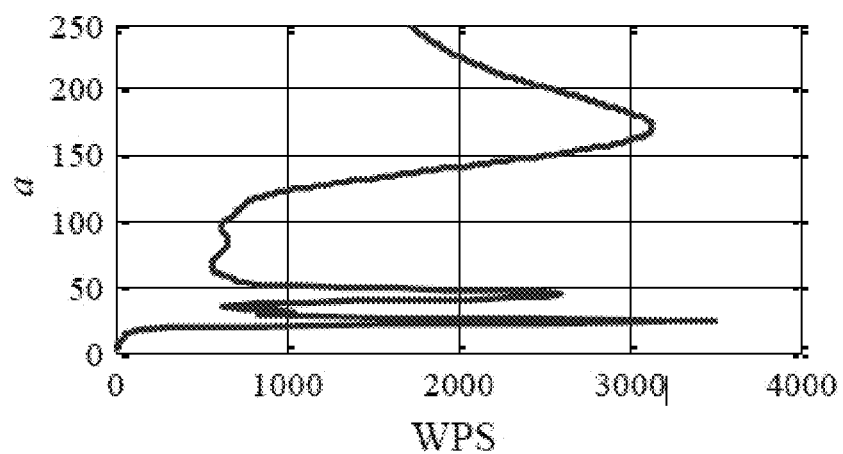
FIG. 10 is a diagram showing a wavelet power spectrum corresponding to the rotor angle of a generator G15.
Figure 11:
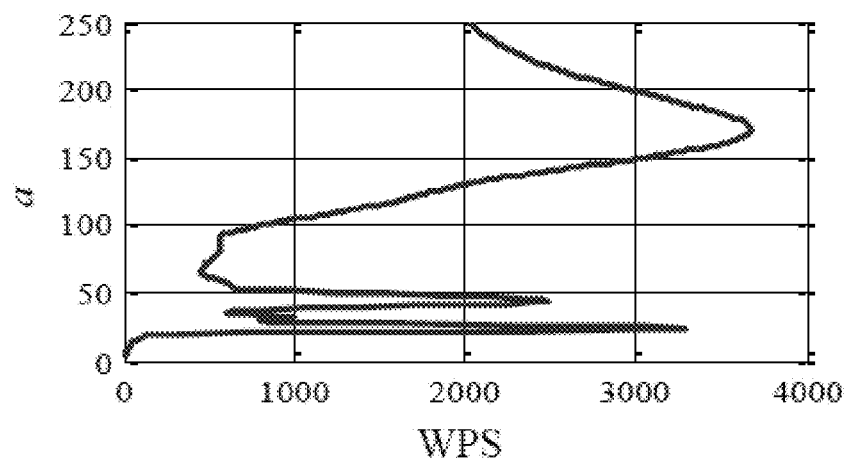
FIG. 11 is a diagram showing a wavelet power spectrum corresponding to the rotor angle of a generator G16.

During the time-domain simulation process, three-phase permanent faults are set on branches 46-49 for a duration of 0.1 s, and the faulted circuits are cut off after 0.1 s. A generator G1 is selected as a reference generator, and the swing curves of rotor angles of generators are shown in FIG. 3 after the power system is disturbed.

The simulation data of rotor angles of generators within 20 s to 50 s is used as an input data in this embodiment. Wavelet transformation is performed on the rotor angle information of each measurement channel, the corresponding wavelet coefficient matrix $W_i$ is calculated, and a wavelet power spectrum corresponding to each wavelet scale factor a is calculated according to the calculated wavelet coefficient matrix $W_i$. FIGS. 4-11 shows wavelet power spectra (WPS) of the rotator angles of generators G3, G7, G9, G11, G13, G14, G15 and G16, respectively. By comprehensively considering the result of MPS calculation of each measurement channel, three critical wavelet scale factor ranges may be obtained, i.e., $R_1$=[170, 171, 172, 173, 174, 175, 176], $R_2$=[40, 41, 42, 43, 44, 45, 46] and $R_3$=[23, 24, 25, 26, 27, 28, 29].

The three key stretch factor segments $R_1$, $R_2$ and $R_3$ correspond to three dominant oscillation modes of the power system excited after the faults on the branches 46-19. To further obtain the detailed dynamic information of the system in each oscillation mode, in this method, wavelet coefficient matrices are reconstructed according to the stretch factors in the three key stretch factor segments, to obtain reconstructed wavelet coefficient matrices in the three key stretch factor segments, i.e., [$W'_{170}$, $W'_{171}$, $W'_{172}$, $W'_{173}$, $W'_{174}$, $W'_{175}$, $W'_{176}$], [$W'_{40}$, $W'_{41}$, $W'_{42}$, $W'_{43}$, $W'_{4-4}$, $W'_{45}$, $W'_{46}$] and [$W'_{23}$, $W'_{24}$, $W'_{25}$, $W'_{26}$, $W'_{27}$, $W'_{28}$, $W'_{29}$].

Singular value analysis is performed on the reconstructed wavelet coefficient matrices, and first singular values of the reconstructed wavelet coefficient matrices are calculated, as shown in Table 1. It can be known from Table 1 that: in the critical wavelet scale factor range $R_1$, the first singular value of the wavelet scale factor $W'_{173}$ (i.e., a173) has maximum value (i.e., 151.8528); in the critical wavelet scale factor range $R_2$, the first singular value of the wavelet scale factor $W'_{44}$ (i.e., a44) has maximum value (i.e., 212.4530); and, in the critical wavelet scale factor range $R_3$, the first singular value of the wavelet scale factor $W'_{24}$ (i.e., a24) has maximum value (i.e., 414.5163). Therefore, the corresponding oscillation frequency and the damping ratio can be estimated by the right singular vectors corresponding to the first singular values of $W'_{173}$, $W'_{44}$ and $W'_{24}$, respectively. The results of estimation are shown in Table 1.

TABLE 1

Determination of dominant oscillation modes.

| Oscillation mode | α | FSV | f/Hz | ζ |
|---|---|---|---|---|
| mode 1 | 170 | 151.4697 | 0.3016 | 0.1996 |
|  | 171 | 151.7034 | 0.3007 | 0.1994 |
|  | 172 | 151.8241 | 0.2998 | 0.1993 |
|  | 173 | 151.8528 | 0.2988 | 0.1995 |
|  | 174 | 151.7348 | 0.2981 | 0.1995 |
|  | 175 | 151.5546 | 0.2969 | 0.1999 |
|  | 176 | 151.2771 | 0.2959 | 0.1904 |
| mode 2 | 40 | 166.5153 | 0.9859 | 0.0521 |
|  | 41 | 179.8770 | 0.9584 | 0.0471 |
|  | 42 | 199.5062 | 0.9207 | 0.0429 |
|  | 43 | 205.0010 | 0.9392 | 0.0433 |
|  | 44 | 212.4530 | 0.9265 | 0.0401 |
|  | 45 | 208.4394 | 0.9207 | 0.0431 |
|  | 46 | 191.0959 | 0.9254 | 0.0427 |
| mode 3 | 23 | 406.8621 | 1.1555 | 0.0459 |
|  | 24 | 414.5163 | 1.1532 | 0.0436 |
|  | 25 | 407.2921 | 1.1501 | 0.0417 |
|  | 26 | 385.3064 | 1.1573 | 0.0486 |
|  | 27 | 386.2145 | 1.1462 | 0.0399 |
|  | 28 | 354.2239 | 1.1414 | 0.0382 |
|  | 29 | 352.4212 | 1.1594 | 0.0520 |

It can be known from Table 1 that the system oscillation modes corresponding to the three critical wavelet scale factor ranges $R_1$, $R_2$ and $R_3$ determined by the method of the present disclosure are as follows: the dominant oscillation mode in the interval $R_1$ has an oscillation frequency of 0.2988 Hz and a damping ratio of 0.1995; the dominant oscillation mode in the interval $R_2$ has an oscillation frequency of 0.9265 Hz and a damping ratio of 0.0401; and, the dominant oscillation mode in the interval $R_3$ has an oscillation frequency of 1.1532 Hz and a damping ratio of 0.0436.

To verify the correctness of the result of identification in the embodiments of the present disclosure, the dominant oscillation modes of the system estimated by a feature analysis method, ARAMX, ERA and SSI are further provided in Table 2. It can be known from the comparison of the dominant oscillation modes identified by these methods in Table 2 that the embodiments of the present disclosure can accurately identify the dominant oscillation modes of the system, so that the correctness of the dominant oscillation modes of the system identified in the embodiments of the present disclosure is proved.

TABLE 2

Comparison of the results of identification by different methods.

| | mode 1 | | mode 2 | | mode 3 | |
|---|---|---|---|---|---|---|
| Method | f/Hz | ζ | f/Hz | ζ | f/Hz | ζ |
| Method of the present disclosure | 0.2988 | 0.1995 | 0.9265 | 0.0401 | 1.1532 | 0.0436 |
| Feature analysis | 0.2949 | 0.1948 | 0.9376 | 0.0433 | 1.1391 | 0.0251 |
| ARMAX | 0.3056 | 0.2057 | 0.9233 | 0.0418 | 1.1322 | 0.0364 |
| ERA | 0.2810 | 0.1858 | 0.9157 | 0.0427 | 1.1408 | 0.0213 |
| SSI | 0.3270 | 0.1534 | 0.9496 | 0.0419 | 1.1387 | 0.0261 |

In accordance with the oscillation modality estimation method provided in the embodiments of the present disclosure, oscillation modalities of the generators in the power system in the three dominant oscillation modes are estimated by the left singular vectors corresponding to the first singular values of $W'_{173}$, $W'_{44}$ and $W'_{24}$. The results are shown in FIGS. 12-17. To verify the correctness of the oscillation modality estimation of each generator in the power system in the embodiments of the present disclosure, system oscillation modalities estimated by a feature value analysis method are further comparatively given in FIGS. 12-17.

Figure 12:
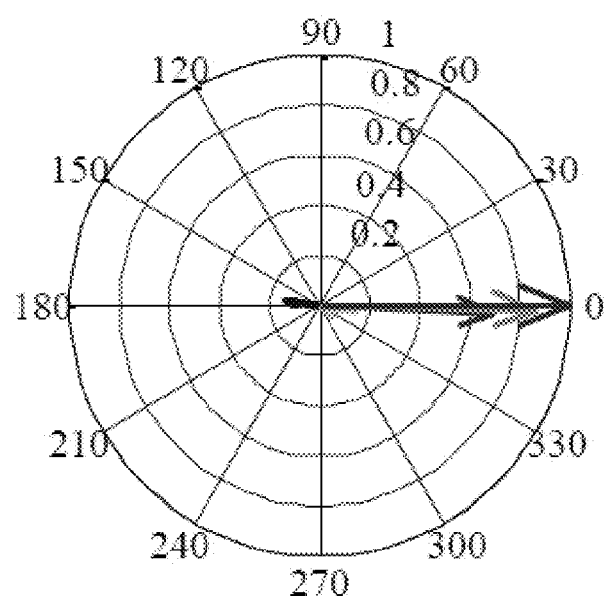
FIG. 12 is a diagram showing an oscillation modality estimated by the present disclosure in an oscillation mode 1.
Figure 14:
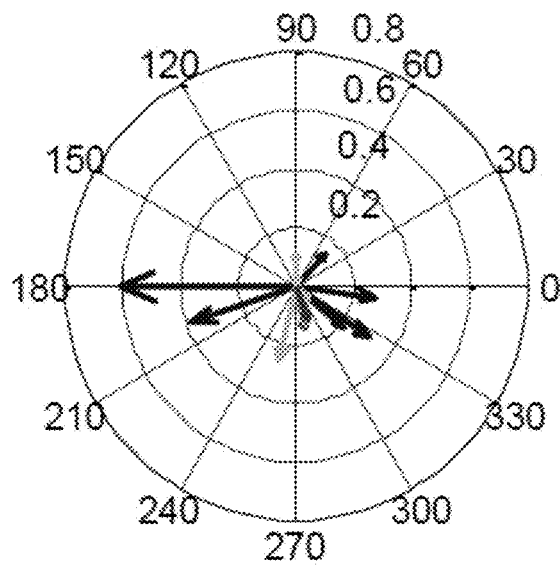
FIG. 14 is a diagram showing an oscillation modality estimated by the present disclosure in an oscillation mode 2.
Figure 16:
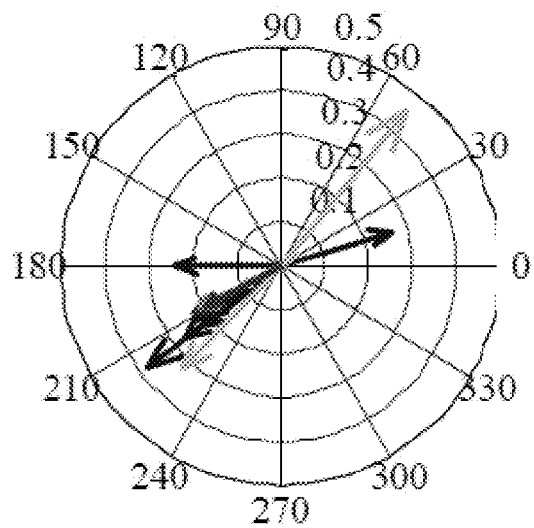
FIG. 16 is a diagram showing an oscillation modality estimated by the present disclosure in an oscillation mode 3.

It can be known from FIGS. 12, 14 and 16 that: the oscillation modalities estimated in the embodiments of the present disclosure indicate that, in the oscillation mode 1, the generators G2, G3, G4, G5, G6, G7, G8 and G9 located in the area 1 are oscillating relative to the generators G10, G11, G12, G13, G14, G15 and G16 located in areas 2, 3, 4 and 5; in the oscillation mode 2, the generators G2 and G3 located in the area 1 are oscillating relative to the generators G4, G5, G6, G7, G8 and G9 in the same area; and, in the oscillation mode 3, the generator G8 located in the area 1 and the generators G10 and G11 in the area 2 are oscillating relative to the generators G2, G3, G4, G5, G6, G7, G9, G12, G13, G14, G15 and G16 located in the areas 1, 2, 3, 4 and 5.

Figure 13:
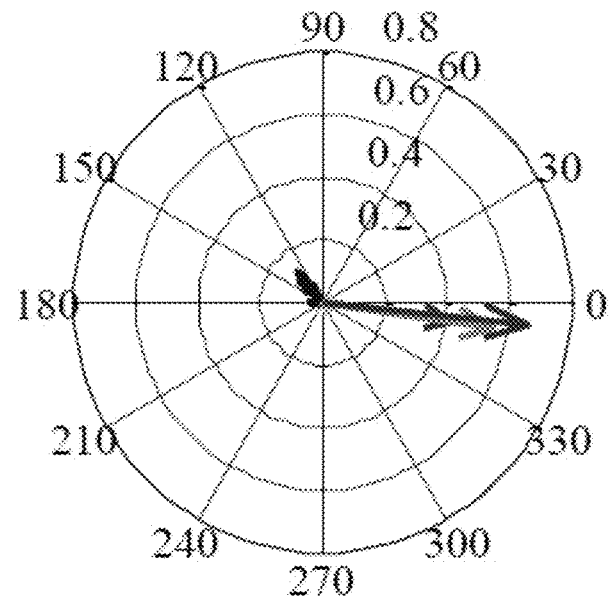
FIG. 13 is a diagram showing an oscillation modality estimated by a feature value analysis method in an oscillation mode 1.
Figure 15:
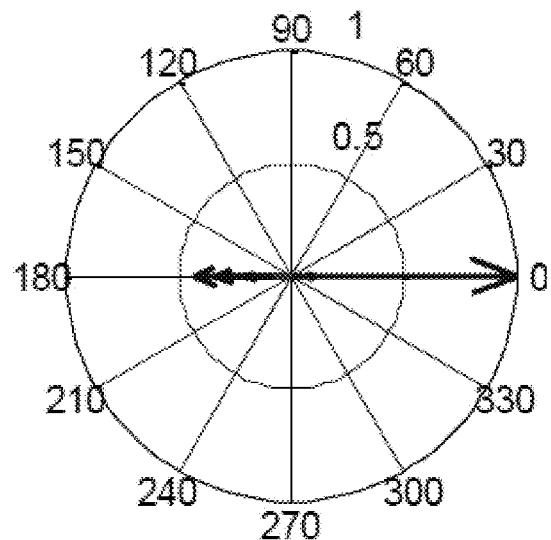
FIG. 15 is a diagram showing an oscillation modality estimated by a feature value analysis method in an oscillation mode 2.
Figure 17:
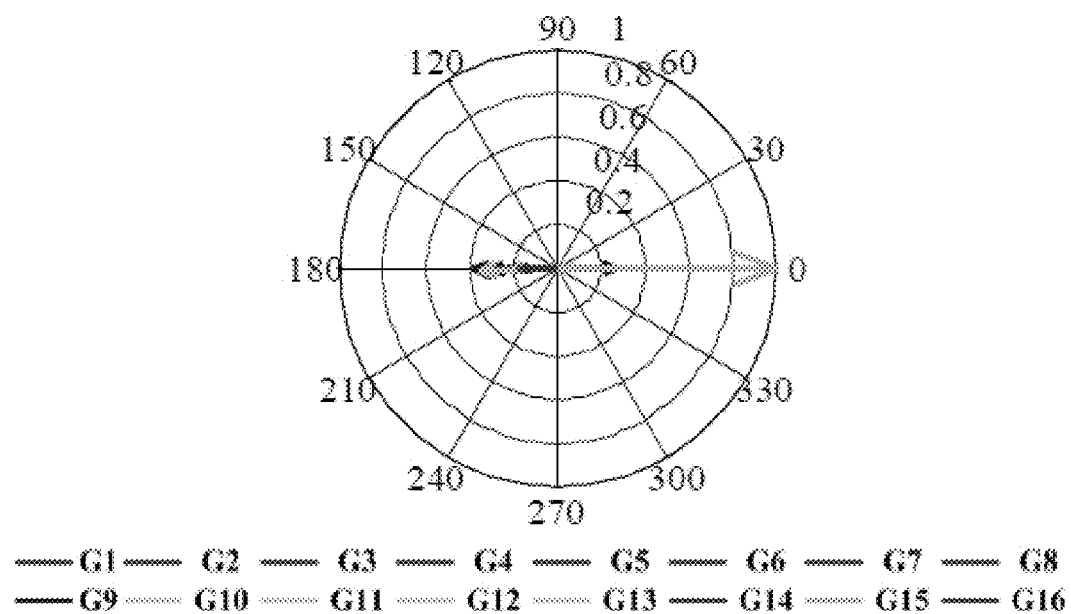
FIG. 17 is a diagram showing an oscillation modality estimated by a feature value analysis method in an oscillation mode 3.

Further, it can be known from the results analyzed by feature value analysis shown in FIGS. 13, 15 and 17 that: in the oscillation mode 1, the generators G2, G3, G4, G5, G6, G7, G8 and G9 located in the area 1 are oscillating relative to the generators G10, G11, G12, G13, G14, G15 and G16 located in the areas 2, 3, 4 and 5; in the oscillation mode 2, the generators G2 and G3 located in the area 1 are oscillating relative to the generators G4, G5, G6, G7, G8 and G9 in the same area; and, in the oscillation mode 3, the generator G8 located in the area 1 and the generators G10 and G11 located in the area 2 are oscillating relative to the generators G2, G3, G4, G5, G6, G7, G9, G12, G13, G14, G15 and G16 located in the areas 1, 2, 3, 4 and 5. By comparing the system oscillation modalities estimated in the embodiments of the present disclosure with the modalities estimated by the feature value analysis method shown in FIGS. 12-17, it can be known that the oscillation modalities of the generators in the power system in different oscillation modes can be accurately calculated by the method of present disclosure.

Figure 18:
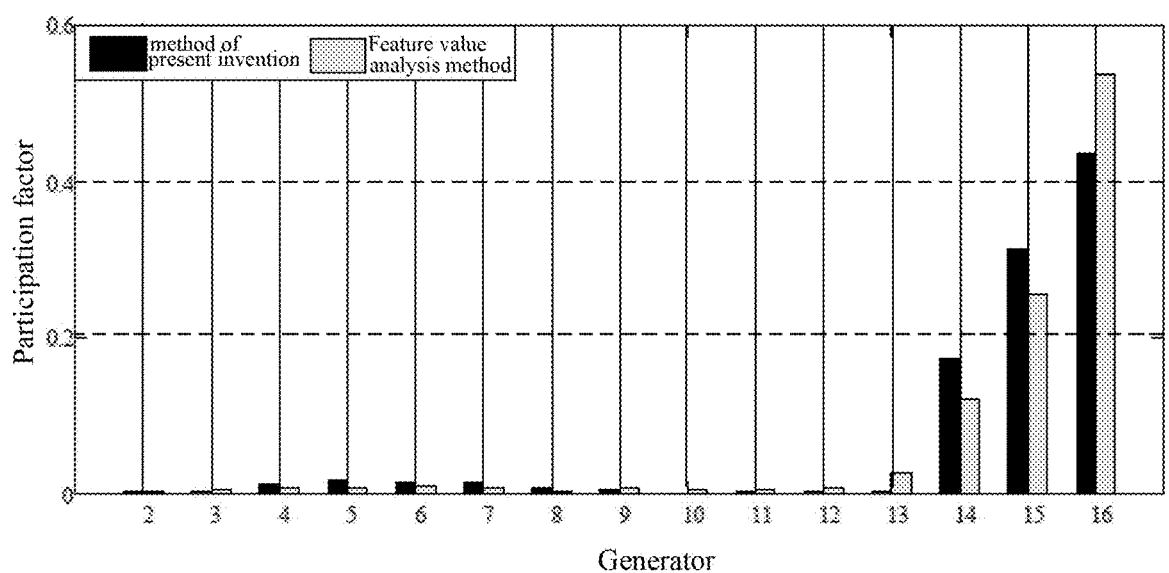
FIG. 18 is a diagram showing participation factors in the oscillation mode 1.
Figure 19:
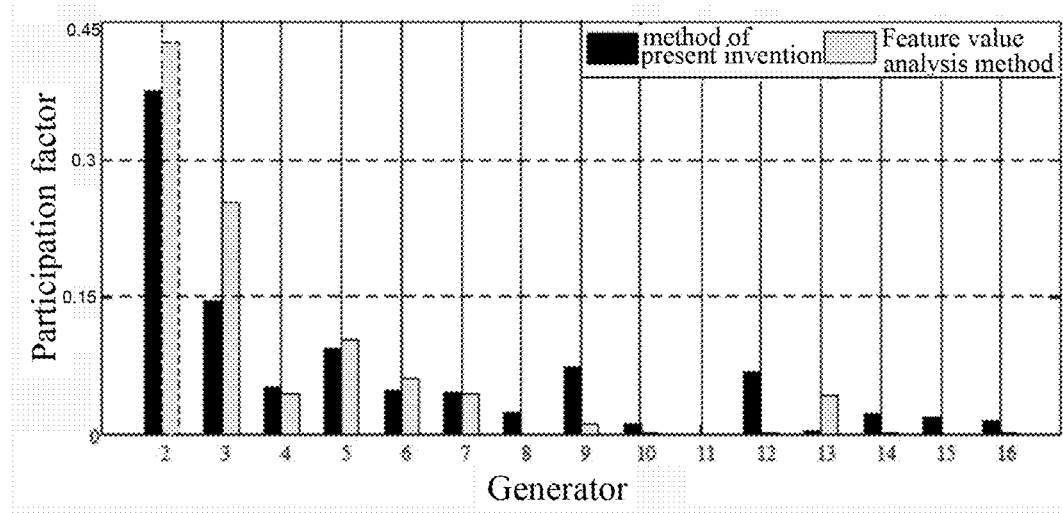
FIG. 19 is a diagram showing participation factors in the oscillation mode 2.
Figure 20:
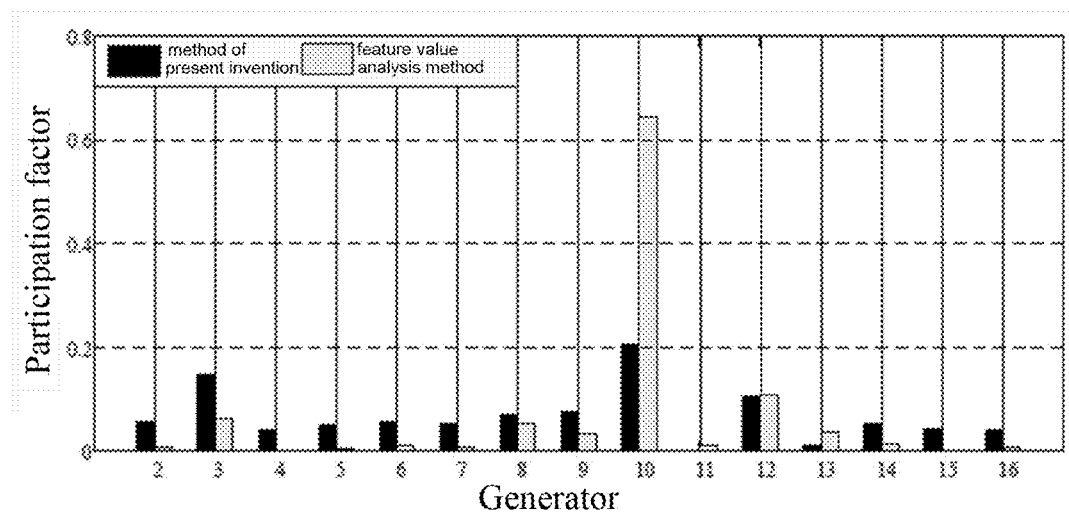
FIG. 20 is a diagram showing participation factors in the oscillation mode 3.

The left feature vectors corresponding to the oscillation modes can be obtained according to the estimated oscillation modalities of the generators in the power system in each oscillation mode and the correspondence between left and right feature vectors. Further, the participation factor of each generator in the system in each oscillation mode is calculated by the estimated left and right feature vectors, as shown in FIGS. 18-20. To verify the correctness of the estimated participation factors in the embodiments of the present disclosure, the participation factors calculated by the feature value analysis method are further provided in the drawings. It can be known from FIGS. 18-20 that, by the calculation in this method, the first three generators having a high degree of participation in the oscillation mode 1 are G14, G15 and G16, respectively; the first three generators having a high degree of participation in the oscillation mode 2 are G2, G3 and G5, respectively; and, the first three generators having a high participation in the oscillation mode 3 are G3, G10 and G12, respectively.

By comparing the first three generators having a high degree of participation in the three oscillation modes calculated by the feature value analysis method, it can be known that the generator groups having a high degree of participation in the three oscillation modes estimated by this method of the present disclosure are basically the same as the results of estimation obtained by the feature analysis method, so that the correctness and validity of the participation factors of the oscillation modes estimated by this method are proved.

Figure 21:
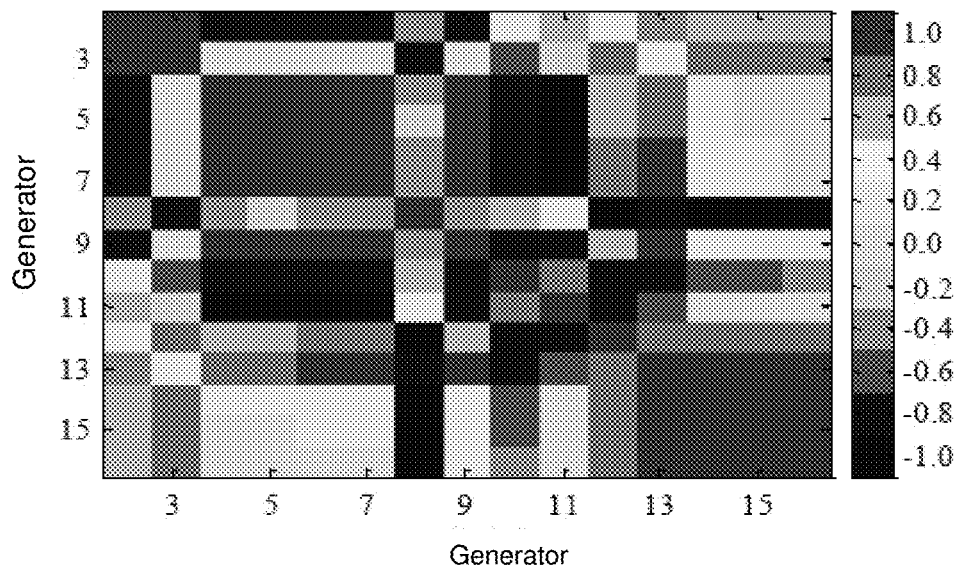
FIG. 21 is a diagram showing a direction cosine of each generator calculated by the present disclosure.

Further, corresponding oscillation modality matrices u are constructed for the oscillation modalities corresponding to the three dominant oscillation modes, and the direction cosines between the generators in the system are calculated when the branches 46-49 in the system are faulted, so that dominant coherent generator groups in the system are estimated. In accordance with the equations (13) and (14), the calculated direction cosines are depicted in FIG. 21 in form of a heat map. It can be known from the direction cosines between the generators calculated by this method that, the generators G2 and G3 are coherent and thus form a first coherent generator group, the generators G4, G5, G6, G7 and G9 are coherent and thus form a second coherent generator group, the generators G13, G14, G15 and G16 are coherent and thus form a third coherent generator group, and the generators G8, G10, G11 and G12 do movement relative to each other and thus form the fourth, fifth, sixth and seventh coherent generator groups. That is, by this method, seven coherent generator groups are finally classified when the power system is disturbed by the faults on the branches 46-49.

Figure 22:
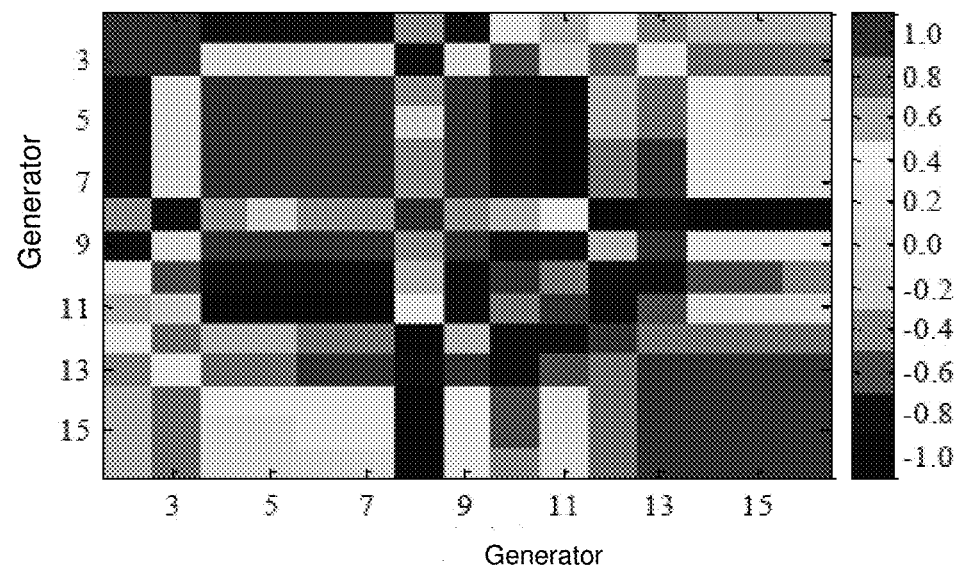
FIG. 22 is a diagram showing a direction cosine of each generator calculated by the feature value analysis method.

FIG. 22 further shows a heat map of the direction cosines between generators calculated by the feature value analysis method. It can be known from the results in FIG. 22 that, the generators G2 and G3 are coherent and thus form a first coherent generator group, the generators G4, G5, G6 and G11 are coherent and thus form a second coherent generator group, the generators G9, G13, G14, G15 and G16 are coherent and thus form a third coherent generator group, the generators G8 and G10 are coherent and thus form a fourth coherent generator group, and the generator G12 independently forms a fifth coherent generator group.

By comparing the coherent generator groups classified by this method of the present disclosure and by the feature value analysis method shown in FIGS. 21 and 22, it can be known that the generators in the key coherent generator groups are basically the same, that is, the generators in the first, second and third coherent generator groups are basically the same, although the number of the coherent generator groups classified by this method and by the feature value analysis method are slightly different.

In addition, the fourth, fifth and sixth coherent generator groups classified by this method may be regarded as subdivisions of the second and fourth coherent generator groups classified based on the feature value analysis method. The result of comparison indicates that the coherent generator groups classified by this method are basically the same as the coherent generator groups classified by the feature value analysis method.

Figure 23:
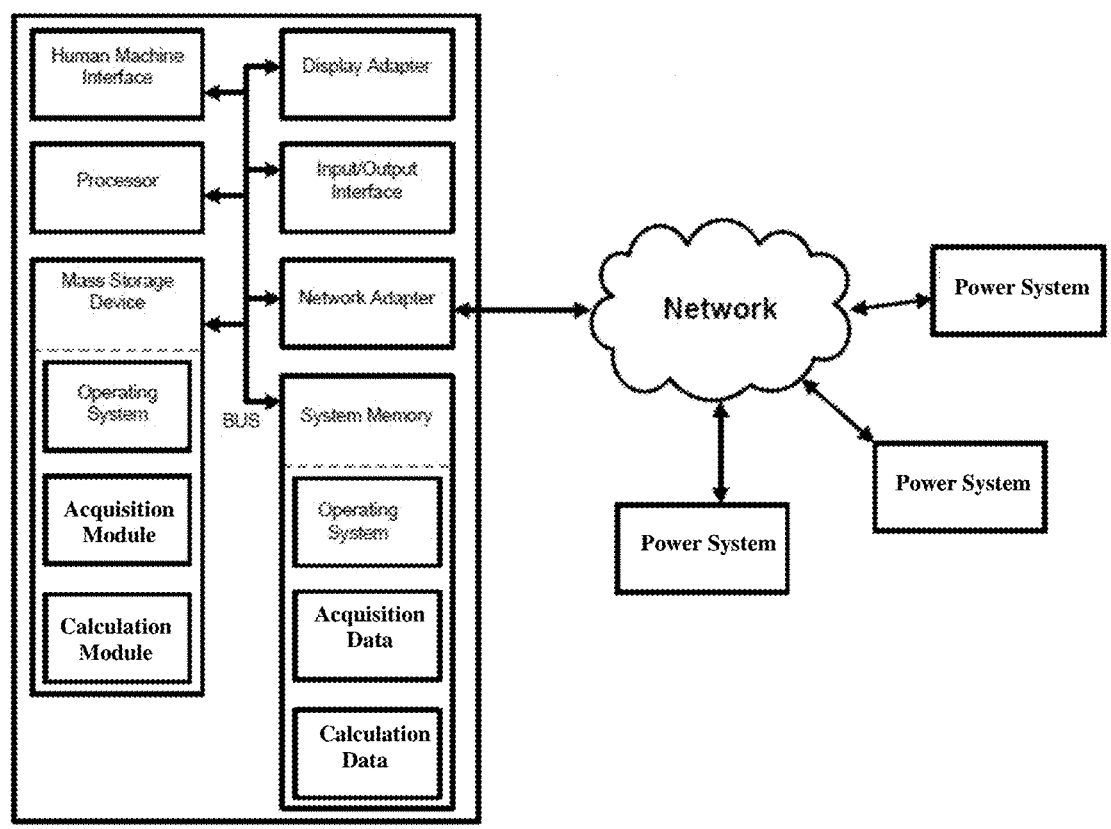
FIG. 23 is a block diagram illustrating a computing system in which the present system and method can operate.

Referring to FIG. 23, the methods and systems of the present disclosure can be implemented on one or more computers. The methods and systems disclosed can utilize one or more computers to perform one or more functions in one or more locations. The processing of the disclosed methods and systems can also be performed by software components. The disclosed systems and methods can be described in the general context of computer-executable instructions such as program modules, being executed by one or more computers or devices. For example, the program modules include operating modules such as an acquisition module, a calculation module, and the like. The acquisition module is configure to acquire each dominant oscillation mode; acquiring a critical wavelet scale factor range corresponding to each dominant oscillation mode; and calculate an oscillation modality of the dominant oscillation mode corresponding to the critical wavelet scale factor range by a left singular vector corresponding to a maximum value among first singular values of each reconstructed wavelet coefficient matrix in the critical wavelet scale factor range. The calculation module is configured to calculate, according to the relation between left and right feature vectors and the estimated oscillation modality, a left feature vector corresponding to each dominant oscillation mode; and then calculating a participation factor of each measurement channel in the power system in this dominant oscillation mode; and calculate direction cosines between measurement channels by the oscillation modality of the dominant oscillation mode, classifying coherent generator groups or coherent bus groups in the system by the direction cosines. These program modules can be stored on the mass storage device of one or more computers devices co-located with a power system or remotely located respect to a power system. Each of the operating modules can comprise elements of the programming and the data management software.

The components of the one or more computers can comprise, but are not limited to, one or more processors or processing units, a system memory, a mass storage device, an operating system, a system memory, an Input/output Interface, a display device, a display interface, a network adaptor, and a system bus that couples various system components. The one or more computers and one or more power system can be implemented over a wired or wireless network connection at physically separate locations, implementing a fully distributed system. By way of example, the one or more computers can be a personal computer, a portable computer, a smart device, a network computer, a peer device, or other common network node, and so on. Logical connections between one or more computers and one or more power systems can be made via a network, such as a local area network (LAN) and/or a general wide area network (WAN).

Those skilled in the art can understand that the accompanying drawings are schematic diagrams of a preferred embodiment, and the serial numbers of the embodiments of the present disclosure are merely descriptive and do not indicate the priority of the embodiments.

The foregoing description of the exemplary embodiments of the present disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

LISTING OF REFERENCES

[1] Zhou N., Pierre J. W., Trudnowski D. A stepwise regression method for estimating dominant electromechanical modes [J]. IEEE Transactions on Power Systems, 2012, 27 (2):1051-1059.
[2] Tripathy P., Srivastava S. C., Singh S. N. A modified TLS-ESPRIT-Based method for low-frequency mode identification in power systems utilizing synchrophasor measurements
[3] [J]. IEEE Transactions on Power Systems, 2001, 26(3): 719-727.
[4] Pierre J. W., Trudnowski D. J., Donnelly M K. Initial results in electromechanical mode identification from ambient data [J]. IEEE Transactions on Power Systems, 1997, 12(3):1245-1251.
[5] Anderson M., Zhou N., Pierre J., et al. Bootstrap-based confidence interval estimates for electromechanical modes from multiple output analysis of measured ambient data [J]. IEEE Transactions on Power Systems, 2005, 20(2):943-950.
[6] Dosiek L., Trudnowski D. J., Pierre J. W. New algorithms for mode shape estimation using measured data [J]. Proceedings of IEEE PES General Meeting, Pittsburgh, USA, 2008:1-8.
[7] Dosiek L., Pierre J. W., Trudnowski D. J., et al. A channel matching approach for estimating electromechanical mode shape and coherence [J]. Proceedings of IEEE PES General Meeting, Calgary, Canada, 2009:1-8.
[8] Dosiek L., Pierre J. W. Estimating electromechanical modes and mode shapes using the multichannel ARMAX model[J], IEEE Transactions on Power Systems, 2013, 28(2):1950-1959.
[9] Wies R. W., Pierre J. W., Trudnowski D. J. Use of ARMA block processing for estimating stationary low-frequency electromechanical modes of power systems [J]. IEEE Transactions on Power Systems, 2003, 18(C-1):167-173.
[10] Zhang Guowen, Tang Baoping, Tang Guangwu. Fast identification of bandwise wavelet modal parameters based on data reduction[J]. Journal of Vibration Engineering, 2012, 25(1):49-54.
[11] Nilanjan Ray Chaudhuri, Balarko Chaudhuri. Damping and relative mode-shape estimation in near real-time through phasor approach. IEEE Transactions on Power Systems, 2011, 26(1):364-373.

What is claimed is:

1. A power system, comprising:
16 generators;
68 buses;
a processor, when executed, configured to perform the following steps of:

setting three-phase permanent faults on branches 46-49 for a duration of 0.1 s, cutting off faulted circuits after 0.1 s; setting generator G1 as a reference generator, wherein swing curves of rotor angles of the 16 generators are obtained after the power system is disturbed;

obtaining rotor angles of generators within 20 s to 50 s as an input data;

performing wavelet transformation on the rotor angle information of each measurement channel;

acquiring each dominant oscillation mode;

acquiring a critical wavelet scale factor range corresponding to each dominant oscillation mode;

obtaining three critical wavelet scale factor ranges, R1= [170, 171, 172, 173, 174, 175, 176], R2=[40, 41, 42, 43, 44, 45, 46] and R3=[23, 24, 25, 26, 27, 28, 29];

calculating an oscillation modality of the dominant oscillation mode corresponding to the critical wavelet scale factor range by a left singular vector corresponding to a maximum value among first singular values of each reconstructed wavelet coefficient matrix in the critical wavelet scale factor range wherein the dominant oscillation mode in the interval R1 has an oscillation frequency of 0.2988 Hz and a damping ratio of 0.1995; the dominant oscillation mode in the interval R2 has an oscillation frequency of 0.9265 Hz and a damping ratio of 0.0401; and, the dominant oscillation mode in the interval R3 has an oscillation frequency of 1.1532 Hz and a damping ratio of 0.0436 and the oscillation modalities indicates that in oscillation mode 1, generators G2, G3, G4, G5, G6, G7, G8 and G9 located in area 1 are oscillating relative to generators G10, G11, G12, G13, G14, G15 and G16 located in areas 2, 3, 4 and 5; in oscillation mode 2, the generators G2 and G3 located in the area 1 are oscillating relative to the generators G4, G5, G6, G7, G8 and G9 in the same area; and in the oscillation mode 3, the generator G8 located in the area 1 and the generators G10 and G11 in the area 2 are oscillating relative to the generators G2, G3, G4, G5, G6, G7, G9, G12, G13, G14, G15 and G16 located in the areas 1, 2, 3, 4 and 5;

calculating, according to the relation between left and right feature vectors and an estimated oscillation modality, a left feature vector corresponding to each dominant oscillation mode;

calculating a participation factor of each measurement channel in the power system in this dominant oscillation mode;

calculating direction cosines between measurement channels by the oscillation modality of the dominant oscillation mode;

classifying coherent generator groups or coherent bus groups in the system by the direction cosines, wherein the first three generators having a high degree of participation in the oscillation mode 1 are G14, G15 and G16, respectively; the first three generators having a high degree of participation in the oscillation mode 2 are G2, G3 and G5, respectively; and the first three generators having a high participation in the oscillation mode 3 are G3, G10 and G12, respectively; and the direction cosines between the generators that the generators G2 and G3 are coherent and thus form a first coherent generator group, the generators G4, G5, G6, G7 and G9 are coherent and thus form a second coherent generator group, the generators G13, G14, G15 and G16 are coherent and thus form a third coherent generator group, and the generators G8, G10, G11 and G12 do movement relative to each other and thus form the fourth, fifth, sixth and seventh coherent generator groups; seven coherent generator groups are finally classified when the power system is disturbed by the faults on the branches 46-49; and establishing dominant coherent generator groups in the system and utilizing the power grid operation state information to improve dynamic stability of the power system.

2. The power system according to claim 1, wherein the steps of "acquiring each dominant oscillation mode" are specifically:

for each critical wavelet scale factor range, reconstructing a wavelet coefficient matrix according to a critical wavelet scale factor, and performing singular value decomposition on each reconstructed wavelet coefficient matrix to obtain first singular values of each reconstructed wavelet coefficient matrix; and comparing the first singular values, acquiring a right singular vector corresponding to the maximum value among the first singular values, and calculating a dominant oscillation mode corresponding to the critical wavelet scale factor range.

3. The power system according to claim 1, wherein the steps of "acquiring a critical wavelet scale factor range corresponding to each dominant oscillation mode" are specifically:

calculating a wavelet power spectrum corresponding to each stretch factor in each wavelet coefficient matrix, and determining a critical wavelet scale factor corresponding to each dominant oscillation mode; and constructing a critical wavelet scale factor range corresponding to each dominant oscillation mode by considering the critical wavelet scale factor.

4. The power system according to claim 1, further comprising:

acquiring, from a wide-area measurement system, state measurement information of the power system, and standardizing the state measurement information; and performing wavelet transformation on the standardized state measurement information in each measurement channel to acquire a wavelet coefficient matrix corresponding to each measurement channel.

\* \* \* \* \*